United States Patent
Dietl et al.

(10) Patent No.: US 7,293,545 B2
(45) Date of Patent: Nov. 13, 2007

(54) METHOD FOR ENLARGING THE CONTROL RANGE FOR EQUALIZING INJECTION QUANTITY DIFFERENCES

(75) Inventors: Roland Dietl, Regensburg (DE); Oliver Kastner, Donaustauf (DE); Hans-Peter Rabl, Kelheim (DE)

(73) Assignee: Siemens Aktiengesellschaft, Munich (DE)

( * ) Notice: Subject to any disclaimer, the term of this patent is extended or adjusted under 35 U.S.C. 154(b) by 23 days.

(21) Appl. No.: 11/331,782

(22) Filed: Jan. 13, 2006

(65) Prior Publication Data

US 2006/0157019 A1    Jul. 20, 2006

(30) Foreign Application Priority Data

Jan. 14, 2005    (DE) ...................... 10 2005 001 887

(51) Int. Cl.
*F02D 41/40* (2006.01)
(52) U.S. Cl. ...................... 123/299; 123/436; 123/481; 123/490
(58) Field of Classification Search ................ 123/299, 123/300, 436, 481, 490
See application file for complete search history.

(56) References Cited

U.S. PATENT DOCUMENTS

| | | | |
|---|---|---|---|
| 5,709,192 A | * | 1/1998 | Zimmermann ............... 123/436 |
| 6,694,945 B2 | * | 2/2004 | Kawaguchi et al. ......... 123/299 |
| 6,694,960 B2 | * | 2/2004 | Hess et al. .................... 123/436 |
| 6,748,920 B2 | * | 6/2004 | Ito et al. ....................... 123/299 |

FOREIGN PATENT DOCUMENTS

| | | |
|---|---|---|
| DE | 197 00 711 A1 | 9/1998 |
| DE | 197 20 009 C2 | 11/1998 |
| DE | 38 02 803 A1 | 8/1999 |
| EP | 0 538 890 B1 | 2/1996 |
| EP | 1 340 900 A2 | 9/2003 |
| EP | 1 375 888 A2 | 1/2004 |

* cited by examiner

*Primary Examiner*—T. M. Argenbright
(74) *Attorney, Agent, or Firm*—Baker Botts L.L.P.

(57) ABSTRACT

In a method for enlarging the control range for equalizing injection quantity differences, in particular in internal combustion engines using multiple injections, if the maximum injection quantity of all the individual injections of an injector of the internal combustion engine is lower than the minimum quantity required for control for equalizing the cylinders, then the injection pattern is changed such that the injection quantity of at least one individual injection is greater than or equal to the required minimum quantity, without changing the torque output of the internal combustion engine.

21 Claims, 1 Drawing Sheet

US 7,293,545 B2

METHOD FOR ENLARGING THE CONTROL RANGE FOR EQUALIZING INJECTION QUANTITY DIFFERENCES

PRIORITY

This application claims priority from German Patent Application No. DE 10 2005 001 887.4, which was filed on Jan. 14, 2005, and is incorporated herein by reference in its entirety.

TECHNICAL FIELD

The invention relates to a method for enlarging the control range for equalizing injection quantity differences, in particular in internal combustion engines using multiple injections.

BACKGROUND

Methods for equalizing injection quantity differences between the cylinders of an internal combustion engine detect differences in the injection quantities between the cylinders and optionally equalize these differences. It is precisely for the diagnosis of small injection quantities—in particular where multiple injection is used in diesel engines of pre-injection quantities that lie in the region of a few milligrams—that a diagnosis of injection quantities is crucial for adhering to exhaust emissions.

Such a method is disclosed for example in the unpublished application DE 10 2004 006 293.

It has proven to be the case that, when equalizing injectors by means of the actuator signal, fixed operating levels have to be run in for several seconds, depending on the injection pressure, in order to be able to determine the actuator energy of the respective injector. In the case of active control, the time between the activation of the injector and that of the actuator signal of all the injectors is set to a value stored in the ignition map. Since a minimum duration of activation of the injector is required for control, this corresponding to a minimum injection quantity, then through the use of multiple injection (one main and several pre- and post-injections), the operating range in which control is possible decreases. Multiple injections are successfully employed for reducing emissions as well as for reducing combustion noise. The following example should illustrate the problem: for a load point A, a quintuple injection of respectively one milligram per stroke is required. However, control for equalizing the cylinders requires a minimum quantity of three milligrams per stroke.

Detection of and control in response to the actuator signal is required precisely when the conditions of the injector change such as, for example, through heating up after a cold start. In this case, it is possible that after a cold start the vehicle will be operated only in a low load range so that there is no possibility of equalizing the cylinders. In such a drive cycle (cold start and subsequent travel in a low load range) the cooling-water temperature changes from the ambient temperature to the target temperature of approx. 90° C. As it does so, the injection quantity can change by approx. 40% due to the heating-up process. Control of the injector in response to the actuator signal is always required once the operating conditions have changed (temperature, rail pressure, etc.).

SUMMARY

The object of the invention is consequently to propose a method for enlarging the control range for equalizing injection quantity differences so that control is also possible in low load ranges.

This object is achieved by a method for enlarging the control range for equalizing injection quantity differences, in particular in internal combustion engines using multiple injections, wherein if the maximum injection quantity of all the individual injections of at least one injector of the internal combustion engine is lower than the minimum quantity required for control for equalizing the cylinders, then the injection pattern of at least one injector is changed such that the injection quantity of at least one individual injection is greater than or equal to the required minimum quantity and the torque output of the internal combustion engine for the vehicle drive remains the same.

The method can be implemented only if at least one activation condition is satisfied. The injection pattern of an individual injector can be modified by adjusting the number of individual injections and/or the duration of injection. For each ignition cycle, the total injection quantity of the injector before modification of the injection pattern can be equal to the total injection quantity of the injector after modification of the injection pattern. The main injection of the injector may comprise at least the required minimum quantity. The modification of the injection pattern can be carried out for each individual activated injector of the internal combustion engine. At least one cylinder can be disabled. Also, every other cylinder, in ignition sequence, can be disabled. After cylinder equalization of the activated cylinders, the previously deactivated cylinders can be enabled and the previously activated cylinders can be disabled. The load can be increased, in particular by connecting additional consumers, and/or the engine efficiency can be decreased, in particular by delaying the injection start.

According to the invention, the method for enlarging the control range for equalizing injection quantity differences, in particular in internal combustion engines using multiple injections, is implemented if the maximum injection quantity of all the individual injections of at least one injector of the internal combustion engine is lower than the minimum quantity required for control for equalizing the cylinders. The injection pattern of at least one injector is then changed such that the injection quantity of at least one individual injection is greater than or equal to the required minimum quantity and the torque output of the internal combustion engine for the vehicle drive remains unchanged.

Using this measure, control for equalizing the cylinders can also be applied in low load ranges. The values of the control are assigned to the characteristic variables of the operating level which are also the main influencing variables (injection pressure, temperature, etc.). If the internal combustion engine is at an operating level in which control of the actuator signal is not possible because the duration of activation is too short (=injection quantity too low), the injection is carried out firstly using the precontrol values or previously learned values. It is particularly advantageous here that the method according to the invention manages without additional sensor technology and that the method can be implemented rapidly, as a small number of piston strokes are sufficient for this purpose. Reliability can thus be increased without additional fuel being consumed.

A further advantageous embodiment of the invention consists in implementing the method according to the invention only if at least one activation condition is satisfied. This refers to changes in operating states or the expiration of a certain time span. This ensures that cylinder equalization can be carried out at regular intervals and in unfavorable activation periods.

It has proven to be advantageous to change the injection pattern of a single injector by adjusting the number of injections and/or the duration of injection. It has been shown to be particularly advantageous for the injection quantity of the injector before modification of the injection pattern to be precisely the same as the total injection quantity of the injector after modification of the injection pattern, for each ignition cycle. In order to render the above example of quintuple injections with one milligram per stroke accessible to control, the method according to the invention can change the injection pattern, for example such that a pre-injection comprising one milligram per stroke and a main injection comprising four milligrams per stroke are set.

A further advantageous embodiment of the invention consists in disabling at least one cylinder. It is particularly advantageous in this case to disable, in ignition sequence, only every other cylinder. The disabling of cylinders can be effected by disabling the injector, i.e. no fuel is injected into the cylinder by the injector in the disabled cylinder. In order for the torque output of the internal combustion engine for the vehicle drive to remain the same, approximately double the quantity of fuel has to be injected into the active cylinder. For the above example with quintuple injections of one milligram per stroke, this measure would be inadequate, so a combination of disabling of the cylinder and modification of the injection pattern has to take place.

If, on the other hand, an injection pattern in normal operating mode comprises three injections, the pre-injection comprising one milligram per stroke, the main injection two milligrams per stroke and the post-injection one milligram per stroke, then the disabling of a cylinder is wholly adequate, since this measure approximately doubles the corresponding quantities. As a result of this measure, the main injection then comprises four milligrams per stroke, a minimum quantity of three milligrams per stroke being required for control.

In order for it to be possible for all the cylinders to be controlled, in an internal combustion engine with an even number of cylinders the previously deactivated cylinders have to be enabled and the previously activated cylinders disabled. This measure is not necessary in the case of an internal combustion engine with an odd number of cylinders. If, for example, in the case of a five-cylinder engine, every other cylinder in ignition sequence is disabled, then the following ignition sequence is obtained: 1-3-5-2-4-1, i.e. after a maximum of four revolutions all the cylinders will have been activated once.

A further advantageous embodiment of the invention has proven to be to increase the load by connecting additional consumers, such as rear-window heating, heater plugs, lighting, seat heating and/or air-conditioning equipment. A further possibility for increasing consumption is produced by decreasing engine efficiency. To do this, it is sufficient to delay the injection start time appropriately.

BRIEF DESCRIPTION OF THE DRAWING

The invention is explained by way of example below with reference to the schematic drawing, in which.

DETAILED DESCRIPTION

Figure 1:
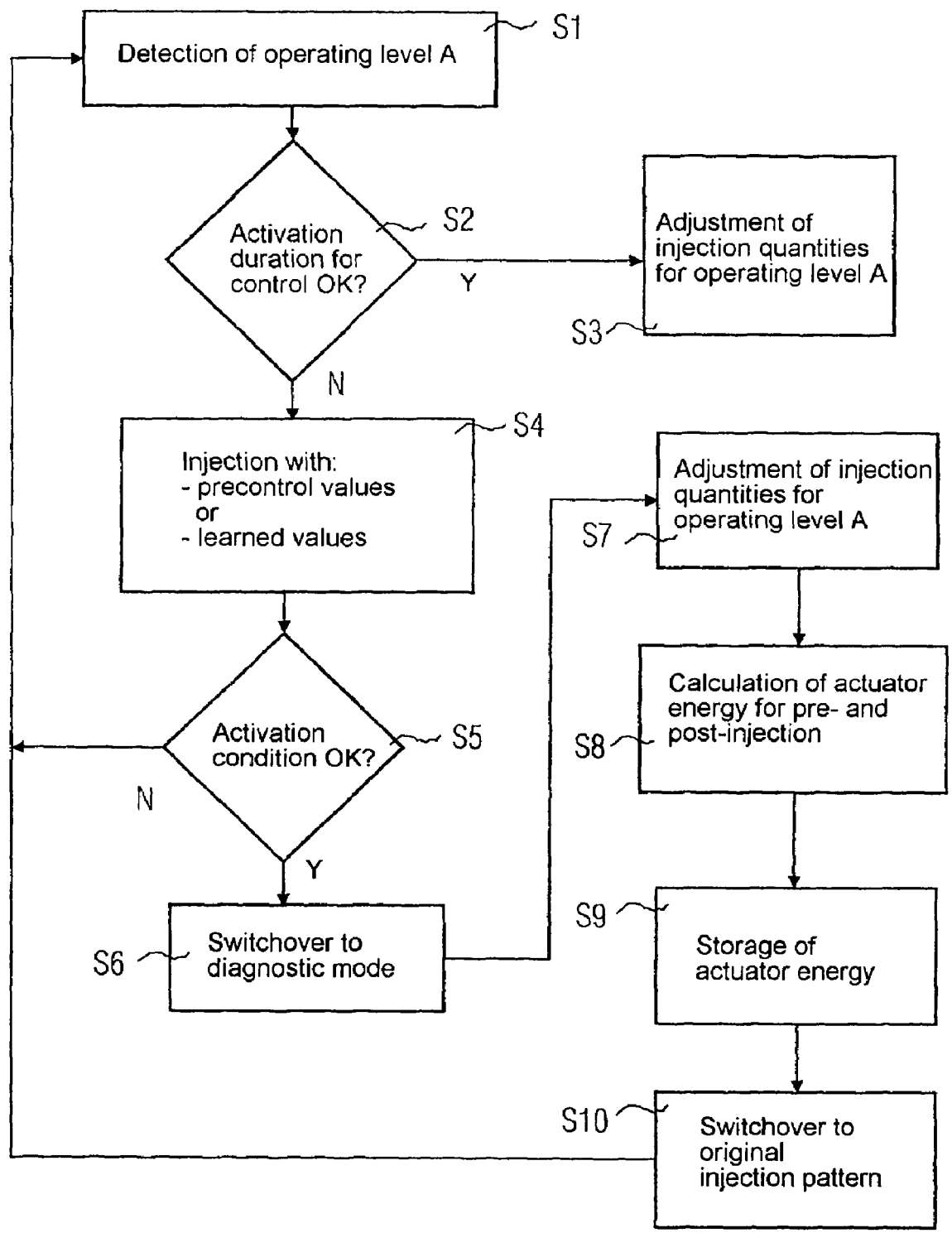
FIG. 1 shows a flow diagram relating to cylinder equalization, wherein the method according to the invention is applied.

FIG. 1 shows a flow diagram relating to cylinder equalization, wherein the method according to the invention is applied. In step S1, the operating level A of the internal combustion engine is detected. Here, among other things, the fuel temperature, the ambient temperature, the rail pressure and/or the injection pressure are recorded. In step S2, a check is carried out of whether the activation period is sufficiently long for control. The activation period has to be chosen such that for each stroke at least three milligrams of fuel per stroke flow through the injector, so that enough time is available for control. If this is the case, i.e. the activation period is sufficiently long, then adjustment of the injection quantity for this operating level is carried out in step S3 in accordance with the methods disclosed in the unpublished application DE 10 2004 006 293.

If the activation period is too short, however, then the injectors are activated in step S4 using precontrol values or previously learned values.

In step S5, a check is carried out to ascertain whether diagnostic mode, as it is called, should be started up. To this end, a check is carried out as to whether the activation conditions are satisfied. These include among other things changing operating states or the expiration of a certain predefined time span. If the activation conditions are not satisfied, then the method begins again at step S1.

If, on the other hand, the activation conditions are satisfied, then in step S6 a switchover to diagnostic mode, as it is called, is carried out. Here, the injection quantity per stroke is increased sufficiently without changing the torque output on the vehicle drive.

In step S7 adjustment of the injection quantity is carried out using the new injection patterns for the operating level A. Since the main injection is used for reliably analyzing an actuator signal, in step S8 the energy for the pre-injection and the energy for the post-injection have to be calculated from the energy for the main injection. As a result, the injection start times and thus the quantities of the individual injectors are matched to one another. These new adjusted values are determined and assigned to the operating state A, in that they are stored in step S9. After equalization of the cylinders has been carried out, the diagnostic mode is disabled in step S10. This means that the original injection pattern is switched to. In order to continuously check and adjust the individual cylinders, after step S10 a jump is made to step S1 and the entire method starts from the beginning again.

What we claim is:

1. A method for enlarging the control range for equalizing injection quantity differences, comprising the step of:
    if the maximum injection quantity of all the individual injections of at least one injector of the internal combustion engine is lower than the minimum quantity required for control for equalizing the cylinders, then changing the injection pattern of at least one injector such that the injection quantity of at least one individual injection is greater than or equal to the required minimum quantity and the torque output of the internal combustion engine for the vehicle drive remains the same.

2. A method according to claim 1, wherein the method is implemented only if at least one activation condition is satisfied.

3. A method according to claim 1, wherein the injection pattern of an individual injector is modified by adjusting the number of individual injections and/or the duration of injection.

4. A method according to claim 3, wherein, for each ignition cycle, the total injection quantity of the injector before modification of the injection pattern is equal to the total injection quantity of the injector after modification of the injection pattern.

5. A method according to claim 1, wherein a main injection of the injector comprises at least the required minimum quantity.

6. A method according to claim 1, wherein the modification of the injection pattern is carried out for each individual activated injector of the internal combustion engine.

7. A method according to claim 1, wherein at least one cylinder is disabled.

8. A method according to claim 7, wherein every other cylinder, in ignition sequence, is disabled.

9. A method according to claim 8, wherein after cylinder equalization of the activated cylinders, the previously deactivated cylinders are enabled and the previously activated cylinders are disabled.

10. A method according to claim 1, wherein the load is increased, in particular by connecting additional consumers, and/or the engine efficiency is decreased, in particular by delaying the injection start.

11. A method according to claim 1, wherein the method is performed in internal combustion engines using multiple injections.

12. A system for enlarging the control range for equalizing injection quantity differences, comprising:
    means to detect if the maximum injection quantity of all the individual injections of at least one injector of the internal combustion engine is lower than the minimum quantity required for control for equalizing the cylinders, and
    means for changing the injection pattern of at least one injector such that the injection quantity of at least one individual injection is greater than or equal to the required minimum quantity and the torque output of the internal combustion engine for the vehicle drive remains the same,
    wherein the means for changing are operable to perform the changes if the means to detect determine that the maximum injection quantity of all the individual injections of at least one injector of the internal combustion engine is lower than the minimum quantity required for control for equalizing the cylinders.

13. A system according to claim 12, wherein the means for changing only operate if at least one activation condition is satisfied.

14. A system according to claim 12, wherein the injection pattern of an individual injector is modified by adjusting the number of individual injections and/or the duration of injection.

15. A system according to claim 14, wherein, for each ignition cycle, the total injection quantity of the injector before modification of the injection pattern is equal to the total injection quantity of the injector after modification of the injection pattern.

16. A system according to claim 12, wherein a main injection of the injector comprises at least the required minimum quantity.

17. A system according to claim 12, wherein the modification of the injection pattern is carried out for each individual activated injector of the internal combustion engine.

18. A system according to claim 12, wherein at least one cylinder is disabled.

19. A system according to claim 18, wherein every other cylinder, in ignition sequence, is disabled.

20. A system according to claim 19, wherein after cylinder equalization of the activated cylinders, the previously deactivated cylinders are enabled and the previously activated cylinders are disabled.

21. A system according to claim 12, wherein the load is increased, in particular by connecting additional consumers, and/or the engine efficiency is decreased, in particular by delaying the injection start.

* * * * *